(12) United States Patent
Kuusilinna et al.

(10) Patent No.: US 9,648,483 B2
(45) Date of Patent: May 9, 2017

(54) DISCOVERY METHOD AND APPARATUSES AND SYSTEM FOR DISCOVERY

(75) Inventors: Kimmo Kuusilinna, Tampere (FI); Timo Aaltonen, Tampere (FI); Tapani Leppänen, Tampere (FI); Arto Palin, Viiala (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/415,559

(22) PCT Filed: Aug. 28, 2012

(86) PCT No.: PCT/FI2012/050819
§ 371 (c)(1),
(2), (4) Date: Jan. 16, 2015

(87) PCT Pub. No.: WO2014/033351
PCT Pub. Date: Mar. 6, 2014

(65) Prior Publication Data
US 2015/0201317 A1 Jul. 16, 2015

(51) Int. Cl.
*H04L 12/28* (2006.01)
*G06F 15/173* (2006.01)
(Continued)

(52) U.S. Cl.
CPC ....... *H04W 8/005* (2013.01); *H04W 52/0209* (2013.01); *H04W 52/0261* (2013.01);
(Continued)

(58) Field of Classification Search
CPC ............. H04W 8/005; H04W 52/0209; H04W 76/023; H04W 52/0261; H04W 84/12; Y02B 60/50
See application file for complete search history.

(56) References Cited

U.S. PATENT DOCUMENTS 6,574,266 B1 6/2003 Haartsen
7,685,288 B2 3/2010 Kakivaya et al.
(Continued)

FOREIGN PATENT DOCUMENTS

EP 1282327 A2 2/2003
EP 2306692 A1 4/2011
(Continued)

OTHER PUBLICATIONS

Krumm et al., "The Near Me Wireless Proximity Server", Proceedings of the Sixth International Conference on Ubiquitous Computing, Sep. 7-10, 2004, 18 pages.
(Continued)

*Primary Examiner* — Kiet Tang
(74) *Attorney, Agent, or Firm* — Alston & Bird LLP

(57) ABSTRACT

The invention relates to methods, apparatuses, systems and computer program products for discovery of nearby devices (510, 520, 525, 540, 545). To facilitate discovery of nearby, i.e. proximal, devices, a discovery control signal (570, 572, 574, 576, 578) from a control device (530) may be used to control the discovery, e.g. how or when the discovery is carried out. The devices may send status information of their status to be used by the control device or the control system for forming the discovery control signal. The control device, e.g. a server, may form the discovery control signal based on this status information. Discovery of proximal devices may then be carried out based on the received discovery control signal.

18 Claims, 10 Drawing Sheets

(51) Int. Cl.
*H04Q 5/22* (2006.01)
*H04W 8/00* (2009.01)
*H04W 52/02* (2009.01)
*H04W 76/02* (2009.01)
*H04W 84/12* (2009.01)

(52) U.S. Cl.
CPC .......... *H04W 76/023* (2013.01); *H04W 84/12* (2013.01); *Y02B 60/50* (2013.01)

(56) References Cited

U.S. PATENT DOCUMENTS

| | | | |
|---|---|---|---|
| 7,725,112 | B2 | 5/2010 | Lehikoinen et al. |
| 8,347,317 | B1 | 1/2013 | Balaji et al. |
| 9,148,742 | B1 | 9/2015 | Koulomzin et al. |
| 9,160,786 | B1 | 10/2015 | Jackson |
| 2005/0113107 | A1 | 5/2005 | Meunier |
| 2005/0188062 | A1 | 8/2005 | Li et al. |
| 2005/0227676 | A1 | 10/2005 | De Vries |
| 2006/0013160 | A1 | 1/2006 | Haartsen |
| 2006/0046709 | A1 | 3/2006 | Krumm et al. |
| 2006/0217132 | A1 | 9/2006 | Drummond-Murray et al. |
| 2007/0182546 | A1 | 8/2007 | Virk et al. |
| 2009/0030999 | A1 | 1/2009 | Gatzke et al. |
| 2009/0323648 | A1 | 12/2009 | Park et al. |
| 2010/0118834 | A1 | 5/2010 | Kalhan |
| 2010/0153762 | A1 | 6/2010 | Radulescu et al. |
| 2010/0165882 | A1 | 7/2010 | Palanki et al. |
| 2010/0254308 | A1 | 10/2010 | Laroia et al. |
| 2010/0329232 | A1 | 12/2010 | Tubb et al. |
| 2010/0332668 | A1 | 12/2010 | Shah et al. |
| 2011/0028093 | A1 | 2/2011 | Patel et al. |
| 2011/0084807 | A1* | 4/2011 | Logan ............... H04Q 9/00 340/10.1 |
| 2011/0088078 | A1 | 4/2011 | Kholaif et al. |
| 2011/0258313 | A1* | 10/2011 | Mallik ............. H04W 8/005 709/224 |
| 2011/0307599 | A1 | 12/2011 | Saretto et al. |
| 2011/0317586 | A1 | 12/2011 | Palanki et al. |
| 2011/0317587 | A1* | 12/2011 | Lida ............... H04L 12/2832 370/254 |
| 2013/0070641 | A1* | 3/2013 | Meier ............... H04W 8/005 370/254 |
| 2013/0090106 | A1 | 4/2013 | Mathews |
| 2013/0172036 | A1 | 7/2013 | Miklos et al. |
| 2013/0303223 | A1 | 11/2013 | Patil et al. |
| 2014/0206348 | A1 | 7/2014 | Johnsson et al. |
| 2015/0139027 | A1* | 5/2015 | Burza ............... H04L 41/12 370/254 |
| 2015/0147972 | A1 | 5/2015 | Motto |
| 2015/0208226 | A1 | 7/2015 | Kuusilinna et al. |
| 2015/0312744 | A1 | 10/2015 | Leppanen et al. |

FOREIGN PATENT DOCUMENTS

| | | |
|---|---|---|
| EP | 2853105 A1 | 4/2015 |
| WO | 2004/004395 A1 | 1/2004 |
| WO | 2009/146279 A1 | 12/2009 |
| WO | 2012092407 | 7/2012 |
| WO | 2012/114161 A1 | 8/2012 |
| WO | 2013/175048 A1 | 11/2013 |
| WO | 2013/175049 A1 | 11/2013 |

OTHER PUBLICATIONS

Tong et al., "Fast Direction-Aware Proximity for Graph Mining", Proceedings of the 13th ACM SIGKDD international conference on Knowledge discovery and data mining, Aug. 12-15, 2007, pp. 747-756.

Sarddar et al., "Reducing Handover Delay by Preselective Scanning Using GPS", International Journal of Distributed and Parallel Systems (IJDPS), vol. 1, No. 2, Nov., 2010, pp. 142-151.

Winiker, "Integration of Cellular Assisted Heterogeneous Networking and Bluetooth Service Discovery Protocol", Thesis, 2004, 113 Pages.

Woodings et al., "Rapid Heterogeneous Connection Establishment: Accelerating Bluetooth Inquiry Using IrDA", IEEE Wireless Communications and Networking Conference, vol. 1, Mar. 17-21, 2002, pp. 1-14.

Scott et al., "Using Visual Tags to Bypass Bluetooth Device Discovery", Mobile Computing and Communications Review, vol. 9, Issue 1, Jan. 2005, pp. 41-53.

International Search Report and Written Opinion received for corresponding Patent Cooperation Treaty Application No. PCT/FI2012/050493, dated Feb. 6, 2013, 12 pages.

International Search Report and Written Opinion received for corresponding Patent Cooperation Treaty Application No. PCT/FI2012/050818, dated Jul. 26, 2013, 17 pages.

International Search Report and Written Opinion received for corresponding Patent Cooperation Treaty Application No. PCT/FI2012/050819, dated May 23, 2013, 13 pages.

Non-Final Office action received for corresponding U.S. Appl. No. 14/400,631, dated Jan. 22, 2016, 12 pages.

Extended European Search Report received for corresponding European Patent Application No. 12877316.5, dated Jan. 25, 2016, 10 pages.

Non-Final Office action received for corresponding U.S. Appl. No. 14/419,594, dated Apr. 8, 2016, 19 pages.

Extended European Search Report received for corresponding European Patent Application No. 12883540.2, dated May 3, 2016, 7 pages.

Extended European Search Report received for corresponding European Patent Application No. 12883827.3, dated May 4, 2016, 8 pages.

Final Office action received for corresponding U.S. Appl. No. 14/400,631, dated May 13, 2016, 15 pages.

Office Action for U.S. Appl. No. 14/419,594, dated Oct. 17, 2016.

* cited by examiner

DISCOVERY METHOD AND APPARATUSES AND SYSTEM FOR DISCOVERY

RELATED APPLICATION

This application was originally filed as PCT Application No. PCT/FI2012/050819 filed Aug. 28, 2012.

BACKGROUND

As the capabilities of portable computers and communication devices develop, new ways of collaboration have become possible. For example, in addition to sending information from one device to another via a mobile communication network, devices may be able to communicate directly from device to device, or use a local network such as WLAN to send information to each other. Users of these devices may thus be able to work together utilizing such device-to-device communication. To be able to do so, the devices need to be connected to each other over a communication channel. Current ways of manually searching for devices to which a connection can be formed are sometimes cumbersome and inefficient.

There is, therefore, a need for solutions that provide for efficient ways to discover devices that are in the vicinity of the user's device.

SUMMARY

Now there has been invented an improved method and technical equipment implementing the method, by which the above challenge is alleviated. Various aspects of the invention include methods, apparatuses, systems and computer program products comprising computer programs, which are characterized by what is stated in the independent claims. Various embodiments of the invention are disclosed in the dependent claims.

The invention relates to methods, apparatuses, systems and computer program products for discovery of nearby devices. To facilitate discovery of nearby, i.e. proximal, devices, a discovery control signal from a control device may be used to control the discovery, e.g. how or when the discovery is carried out. The devices may send status information of their status to be used by the control device or the control system for forming the discovery control signal. The control device, e.g. a server, may form the discovery control signal based on this status information. Discovery of proximal devices may then be carried out based on the received discovery control signal.

For example, the information on power source and the status of the power source (e.g. how much charge remains in a battery) may be used by the system to decide which device will carry out discovery and in which role the devices will act in the discovery. By selecting the most suitable devices to carry out the most power-consuming part of discovery, the system may make it possible to save energy on battery-powered devices and thereby lengthen their operating time. Other status information like available discovery channels, movement information and social network information may be used to control the discovery of proximal devices.

According to a first aspect there is provided a method, comprising sending status information to a control device, receiving a discovery control signal from a control device, the discovery control signal having been formed at least partially based on the status information, and carrying out discovery of proximal devices based on the discovery control signal.

According to an embodiment, the method comprises determining a limitation of using a first discovery channel, and forming the status information using information of the determined limitation of using the first discovery channel. According to an embodiment, the method comprises carrying out the discovery of proximal devices using a second discovery channel, the second discovery channel being different from the first discovery channel, based on the discovery control signal. According to an embodiment, the method comprises carrying out the discovery on a discovery channel in a synchronized manner to another device based on the discovery control signal, the discovery control signal comprising synchronization information for carrying out the discovery. According to an embodiment, the method comprises forming the status information to comprise information on a type of power source of a device such as battery power or mains. According to an embodiment, the method comprises forming the status information to comprise information on power source state of a device such as remaining battery energy. According to an embodiment, the method comprises carrying out the discovery based on the discovery control signal and the power source state, for example by determining discovery frequency at least partially based on remaining battery energy. According to an embodiment, the method comprises determining a density measure indicative of proximal devices, for example using a number of detected devices or detected networks, and forming the status information to comprise information on the density measure. According to an embodiment, the method comprises forming the status information to comprise information on physical movement of a device, for example by using an accelerometer. According to an embodiment, the method comprises determining a coarse proximity information related to at least one radio channel, the coarse proximity information comprising information on availability of the radio channel at a device, and forming the status information to comprise information on the coarse proximity information. According to an embodiment, the method comprises forming the status information to comprise information on social network related to a device. According to an embodiment, the method comprises avoiding or reducing discovery based on at least one from the group of limitation of discovery channel, type of power source of a device, status of power source of a device, density of devices, physical movement of a device, available radio channels at a device, and social network information related to devices. According to an embodiment, the method comprises sending proximity information of discovered proximal devices to the control device for creation of the discovery control signal based on the proximity information.

According to a second aspect there is provided a method, comprising receiving status information from at least one device, forming a discovery control signal based at least partially on the received status information, and sending the discovery control signal to a first device for controlling discovery of proximal devices. According to an embodiment, the method comprises determining a limitation of using a first discovery channel from the status information, and based on the limitation, forming the discovery control signal to comprise an instruction for carrying out the discovery of proximal devices using a second discovery channel, the second discovery channel being different from the first discovery channel. According to an embodiment, the method comprises forming the discovery control signal to comprise an instruction and synchronization information for carrying out the discovery on a discovery channel in a synchronized manner to another device based on the discovery control signal. According to an embodiment, the method comprises forming the discovery control signal based on information on a type of power source for at least one device. According to an embodiment, the method comprises forming the discovery control signal based on information on a status of a power source for at least one device. According to an embodiment, the method comprises forming the discovery control signal to comprise information for carrying out the discovery based on the type of power source or the power source state, for example by determining discovery frequency at least partially based on remaining battery energy. According to an embodiment, the method comprises determining a density measure for location of devices; for example using a number of detected devices or detected networks, and/or from the status information; and forming the discovery control signal based on the density measure. According to an embodiment, the method comprises forming the discovery control signal based on physical movement of a device, for example by using information from an accelerometer or positioning unit. According to an embodiment, the method comprises determining a coarse proximity information related to at least one radio channel, the coarse proximity information comprising information on availability of the radio channel at a device, and forming the discovery control signal based on the coarse proximity information. According to an embodiment, the method comprises forming the discovery control signal based on information on social network related to a device. According to an embodiment, the method comprises forming the discovery control signal to comprise information and/or instructions for avoiding or reducing discovery based on at least one from the group of limitation of discovery channel, type of power source of a device, status of power source of a device, density of devices, physical movement of a device, available radio channels at a device, and social network information related to devices. According to an embodiment, the method comprises receiving the status information for a plurality of devices, and selecting at least one device to carry out the discovery based on the received status information. According to an embodiment, the method comprises receiving proximity information of discovered proximal devices, forming the discovery control signal based on the proximity information. According to an embodiment, the method comprises forming a proximity graph of a plurality of devices, forming the discovery control signal using the proximity graph. According to an embodiment, the method comprises traversing the proximity graph to detect proximal devices using the proximity graph thereby avoiding discovery at least partially, and using status information from at least one device to limit the graph traversal. According to an embodiment, the status information comprises coarse proximity information, and the traversing is limited to comprise devices in the same coarse proximity area. According to an embodiment, the method comprises at least partially avoiding the traversing and/or the discovery by detecting that sufficient proximity information exists for a group of devices. According to an embodiment, the group is a social group such as friends in a social network service.

According to a third aspect, there is provided an apparatus comprising at least one processor, memory including computer program code, the memory and the computer program code configured to, with the at least one processor, cause the apparatus to perform the method according to the first or second aspect and embodiments thereof.

According to a fourth aspect, there is provided a system comprising at least one processor, memory including computer program code, the memory and the computer program code configured to, with the at least one processor, cause the system to perform the method according to the first or second aspect and embodiments thereof.

According to a fifth aspect, there is provided an apparatus with means for carrying out the parts of the method of the first or second aspect and embodiments thereof.

According to a sixth aspect, there is provided a system with means for carrying out the parts of the method of the first or second aspect and embodiments thereof.

According to a seventh aspect, there is provided a computer program product embodied on a non-transitory computer readable medium, comprising computer program code configured to, when executed on at least one processor, cause an apparatus or a system to send status information to a control device, receive a discovery control signal from a control device, the discovery control signal having been formed at least partially based on the status information, and carry out discovery of proximal devices based on the discovery control signal.

According to an eighth aspect, there is provided a computer program product embodied on a non-transitory computer readable medium, comprising computer program code configured to, when executed on at least one processor, cause an apparatus or a system to receive status information from at least one device, form a discovery control signal based at least partially on the received status information, and send the discovery control signal to a first device for controlling discovery of proximal devices.

According to a ninth aspect, there is provided a computer program product embodied on a non-transitory computer readable medium, comprising computer program code configured to, when executed on at least one processor, cause an apparatus or a system to carry out the method according to the first or second aspect and embodiments thereof.

According to a tenth aspect, there is provided use of status information of at least one device in forming a control signal at a second device for controlling in a first device discovery of proximal third devices.

DESCRIPTION OF THE DRAWINGS

In the following, various embodiments of the invention will be described in more detail with reference to the appended drawings, in which.

DESCRIPTION OF EXAMPLE EMBODIMENTS

Figure 1A:
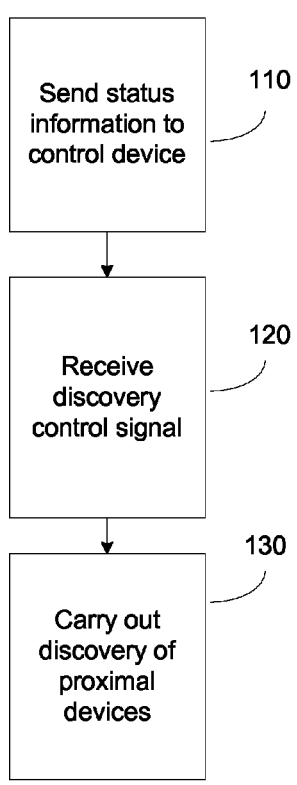
FIGS. 1a, 1b and 1c show flow charts of methods according to example embodiments.

In the following, several embodiments of the invention will be described in the context of discovery of proximal devices. It is to be noted, however, that the invention is not limited to discovery. In fact, the different embodiments have applications widely in any environment where optimization of forming communication connections between devices is required.

In the following, the various embodiments are explained with reference to systems that utilize proximity of other devices, e.g. sharing and multi-player game applications. Proximity of other devices may be detected e.g. when the application is started, that is, a discovery may be carried out. An application may try to e.g. create a Bluetooth connection to other devices for peer-to-peer communication.

In various embodiments, there may be a system of proximity-based services where the services are typically joint actions for several devices collaborating based on their proximity, that is, actions and services are available depending on other devices that are nearby.

For example, there may be envisioned smart space concepts in nomadic environments based on devices that are in the proximity of each other. There may not be many devices/services that are fixed in the space, and the proximity and connection configuration may be changing when devices are moving. For such envisioned concepts it may be useful to find out which devices are in the proximity of each other. The various embodiments may be applied to group forming, as well. Many multi-user or collaborative applications and services require a notion of a group of users/devices. The embodiments may be used for a real-world based group forming technique, that is, to find devices/people that are nearby. Sharing and other collaborative applications may then utilize ad hoc groups formed in such manner.

Proximity information may be sensed by the devices using short range radios, light, sound etc., to find other devices that are in the proximity. Positioning techniques (GPS, indoor positioning) may be used, as well. In addition, some use cases may utilize additional information in addition to the proximity (distance)—it may be useful to know e.g. which devices are in the same room so that they can interact with each other. Proximity sensing based on radio signals may lack this information and other techniques may be used, e.g. audio beacon or light (e.g. infrared).

For some use cases it may be sufficient that one device is searching the nearby devices once an application or a task is launched. The proximity sensing may be quite slow, e.g. with Bluetooth it may take several tens of seconds, depending on the number of devices in the proximity. In a general case, for prolonged use and for faster response, the proximity information may be kept up-to-date all the time. The proximity information may be presented as a graph where a node denotes a device and an edge denotes the proximity.

In the present invention, it has been noticed that there may be problems in a traditional, straightforward proximity sensing/discovery approach. For example, several devices may use the same sensing technique at the same time, and this may disturb or completely block the sensing. For example, if several devices are performing Bluetooth discovery at the same time, the discovery may fail on all devices, i.e., no devices are found. As another example, it has been noticed that two-way sensing may be unnecessary: if A is in B's proximity, it is enough that only one of the devices is performing the sensing. In other words, it has been noticed that the overall functionality of discovery is not optimized. Moreover, proximity sensing may require resources like battery power, and more efficient ways of carrying out proximity sensing are needed.

Figure 1B:
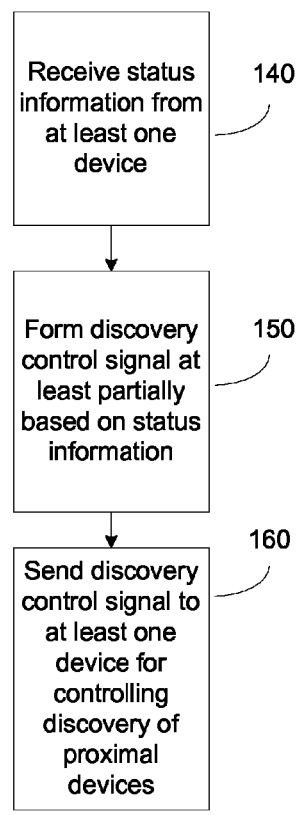
Figure 1C:
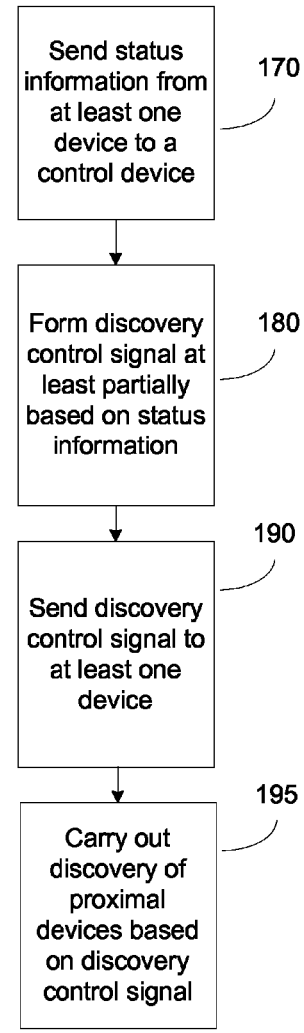

FIGS. 1a, 1b and 1c show flow charts of methods according to example embodiments. In an example embodiment operating in one or more user devices as in FIG. 1a, status information is sent to a control device in phase 110. Status information may comprise information concerning e.g. a limitation of using a discovery channel at a certain device, a type and/or a status of a power source of a device, the density of devices, movement and other physical parameters of a device, some coarse proximity information like a cell identifier of a GSM or WLAN cell, or a social network group related to a device. The sending may happen by sending a message or a signal from a user device to a control device, or the sending may take place so that status information on a device is provided to be accessible across an interface, e.g. from the user device or from a service (another device or computer). Based on this status information, a control device may form a discovery control signal, and the user device may receive the discovery control signal in phase 120. The discovery control signal may be received by one, two or more devices, e.g. all devices in a certain area, to control the discovery that the devices carry out. Devices carry out discovery to find other devices in their proximity, that is, other devices to which a communication connection could be formed. Devices may also be instructed to help to locate or position other devices without the need to form a communication connection between devices. For example, the device may have information on nearby devices in its memory, and this information may be provided to a proximity server. The controlling of the discovery may comprise e.g. selecting the discovery channel (e.g. Bluetooth or WLAN), and/or the frequency and/or timing of carrying out the discovery. Discovery channel may be understood to mean a physical radio connection such as BlueTooth or WLAN, a configuration of a data connection for example including an address or network identification, name of an access point, connection parameters etc. Discovery channel may also be any other way of determining whether other devices are in the proximity or are reachable by a communication connection. Discovery channel may thus mean e.g. any means and/or setup of determining and/or finding out and/or locating nearby devices. In phase 130, the discovery is carried out at least partially based on the discovery control signal. To use the information of the discovery control signal may allow an individual user device to avoid discovery at least partially, or to perform the discovery in an efficient manner, e.g. in synchrony with another device. Thus, the device may save energy or avoid interfering with other communication.

In FIG. 1b, operation of a proximity server or a proximity service is depicted. In phase 140, status information of one or more devices is received or retrieved. Based on the status information, the proximity server or service may determine, for example, which devices will carry out discovery. For example, it may be decided by the proximity server or service that one or more devices that are connected to the mains power will act as a transmitter in discovery, while one or more devices running on battery power will act as receiver, or in a way that a mains powered device carries out the most power consuming operations, e.g. in BT LE discovery channel, the device may perform the scanning while other devices carry out the advertisement. The proximity server may also determine time-wise synchronization of two or more devices for carrying out synchronization. To be able to control the devices, e.g. end-user devices or other network elements, the proximity server may form a discovery control signal (e.g. a discovery control message to be sent to a device) in phase 150. The discovery control signal may comprise instructions and/or information to devices for carrying out discovery. For example, timing information or instructions not to carry out discovery may be included in the discovery control signal. When the discovery control signal has been formed, e.g. a message has been formed to be sent, or the discovery control information has been provided to be accessible at an interface like and internet service, the discovery control signal is delivered or provided to be accessible to a device in phase 160. The device may then receive or access the discovery control signal and carry out discovery accordingly.

FIG. 1c depicts the operation of a system according to an example embodiment. In phase 170, status information from one or more devices is obtained and delivered to a control device or a control system, as was described in context of phase 110 above. In phase 180, discovery control signal is formed at a control system, like in phase 150, and sent to at least one device in phase 190. In phase 195, discovery of proximal devices is carried out in an orchestrated manner so that the devices taking part to discovery operate in optimal manner regarding their resources and regarding timing of discovery messages.

Figure 2A:
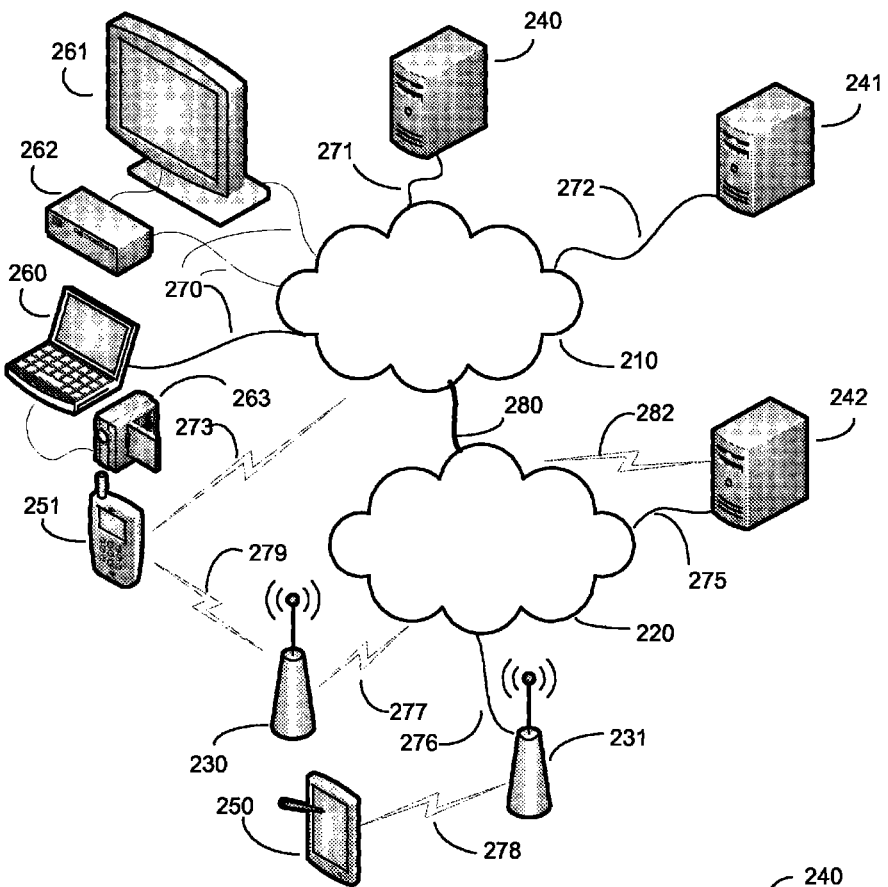
FIGS. 2a and 2b show a system and devices according to example embodiments.
Figure 2B:
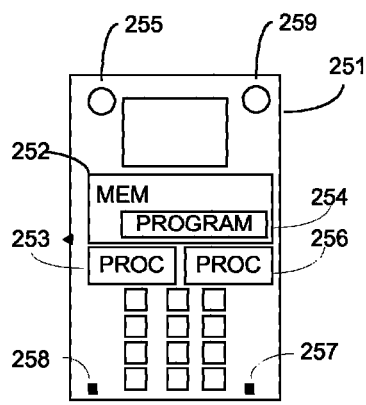
Figure 2B:
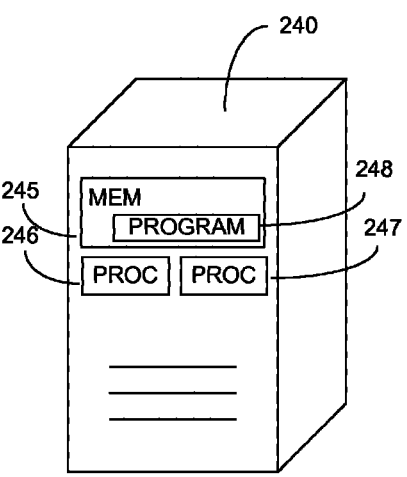

FIGS. 2a and 2b show a system and devices for controlling discovery according to an embodiment. In FIG. 2a, the different devices may be connected via a fixed network 210 such as the Internet or a local area network; or a mobile communication network 220 such as the Global System for Mobile communications (GSM) network, 3rd Generation (3G) network, 3.5th Generation (3.5G) network, 4th Generation (4G) network, Wireless Local Area Network (WLAN), Bluetooth®, or other contemporary and future networks. Different networks are connected to each other by means of a communication interface 280. The networks comprise network elements such as routers and switches to handle data (not shown), and communication interfaces such as the base stations 230 and 231 in order for providing access for the different devices to the network, and the base stations 230, 231 are themselves connected to the mobile network 220 via a fixed connection 276 or a wireless connection 277.

There may be a number of servers connected to the network, and in the example of FIG. 2a are shown a server 240 for offering a network service for proximity service and controlling proximal discovery and connected to the fixed network 210, a server 241 for processing (e.g. filtering) proximity data and connected to the fixed network 210, and a server 242 for offering a network service e.g. a social networking service and connected to the mobile network 220. Some of the above devices, for example the computers 240, 241, 242 may be such that they make up the Internet with the communication elements residing in the fixed network 210.

There are also a number of end-user devices such as mobile phones and smart phones 251, Internet access devices (Internet tablets) 250, personal computers 260 of various sizes and formats, televisions and other viewing devices 261, video decoders and players 262, as well as video cameras 263 and other encoders. These devices 250, 251, 260, 261, 262 and 263 can also be made of multiple parts. The various devices may be connected to the networks 210 and 220 via communication connections such as a fixed connection 270, 271, 272 and 280 to the internet, a wireless connection 273 to the internet 210, a fixed connection 275 to the mobile network 220, and a wireless connection 278, 279 and 282 to the mobile network 220. The connections 271-282 are implemented by means of communication interfaces at the respective ends of the communication connection.

FIG. 2b shows devices for controlling proximal device discovery according to an embodiment. As shown in FIG. 2b, the server 240 contains memory 245, one or more processors 246, 247, and computer program code 248 residing in the memory 245 for implementing, for example, proximity service functionality. The different servers 241, 242 may contain at least these same elements for employing functionality relevant to each server. Similarly, the end-user device 251 contains memory 252, at least one processor 253 and 256, and computer program code 254 residing in the memory 252 for implementing, for example, controlled discovery of proximal devices. The end-user device may also have one or more cameras 255 and 259 for capturing image data, for example video. The end-user device may also contain one, two or more microphones 257 and 258 for capturing sound. The different end-user devices 250, 260 may contain at least these same elements for employing functionality relevant to each device. The end user devices may also comprise a screen for viewing a graphical user interface. The end-user devices and servers may also comprise various communication modules or communication functionalities implemented in one module for communicating with other devices and for carrying out discovery of nearby devices.

The various end-user devices and servers may take the form of communication devices, or other devices having communication capability. For example, the devices may be toys, home appliances like kitchen machines, entertainment devices (TV, music/media devices), or even parts of the building, clothes, vehicles, or any other devices that may communicate with each other and whose discovery may thus be controlled.

It needs to be understood that different embodiments allow different parts to be carried out in different elements. For example, determining proximity information or handling a discovery control signal may be carried out entirely in one user device like 250, 251 or 260, or in one server device 240, 241, or 242, or across multiple user devices 250, 251, 260 or across multiple network devices 240, 241, 242, or across both user devices 250, 251, 260 and network devices 240, 241, 242. For example, the proximity information may be formed and stored in one device, the discovery of proximal devices may happen in another device and the control of the proximity discovery may be carried out in a third device (e.g. a server). The relevant software for carrying out the functionality may reside on one device or distributed across several devices, as mentioned above, for example so that the devices form a so-called cloud.

The different embodiments may be implemented as software running on mobile devices and optionally on servers. The mobile phones may be equipped at least with a memory, processor, display, keypad, motion detector hardware, and communication means such as 2G, 3G, WLAN, or other. The different devices may have hardware like a touch screen (single-touch or multi-touch) and means for positioning like network positioning or a global positioning system (GPS) module. There may be various applications on the devices such as a calendar application, a contacts application, a map application, a messaging application, a browser application, a gallery application, a video player application and various other applications for office and/or private use. The devices may have various communication modules for communicating with other devices and discovering proximal devices.

The proximity server may maintain a proximity graph for use in various services. The proximity information may be filtered for various services, e.g. a dating service, and this filtering may happen at the proximity server or at another unit. A service server (e.g. for the dating service) may receive notifications of changes in devices' proximity groups from the filtering unit and produce the actual service which is visible to the end user. In the various embodiments, the proximal discovery of other devices may be controlled and orchestrated e.g. by the proximity server or another server.

In a proximity service provided by the proximity server a device notices e.g. through discovery with a short-range radio that it is in another device's proximity and communicates this information to the proximity server that in turn provides this information for use in services based on proximity. The system may provide and use proximity information for e.g. proximity gaming, messaging, media streaming between devices etc. The proximity information may comprise information like discovered device identifications, WiFi access point information, cellular network cell id and such. The server may create a proximity graph.

Devices may discover other devices in the proximity using several heterogeneous techniques and provide this information to a proximity server. The proximity server may store and maintain the proximity information up-to-date, e.g. as a graph or more specifically, a data structure storing connection information (edges) between nodes and connection attributes. Radio-based environment fingerprinting (e.g. RSSI and device identification information) may be reported to the proximity server as well. This fingerprinting information may be collected during normal communication operation, and hence no position or local connection related measurements may be needed. The proximity server may combine this fingerprinting information reported by different devices and orchestrate local measurements based on this information.

The proximity server may orchestrate the devices' discovery based on the current and past proximity information, e.g. the proximity graph. This may allow global optimization for the proximity discovery (sensing) to reduce power consumption, discovery collisions, and to get more accurate proximity information by controlling the use of heterogeneous sensing technologies available on the devices. For example, the server may instruct or control the devices to use a certain discovery technique (WLAN, Bluetooth, sound beacon, infrared beacon) and/or a certain power (e.g. radio transmission power, sound volume), and also regulate which devices and when will perform the discovery. This controlling or instructing may happen by using a discovery control signal, e.g. sending parameters to the devices on how they perform discovery, and the devices may then use these parameters. The devices may also modify the received parameters or discovery control information.

Figure 3A:
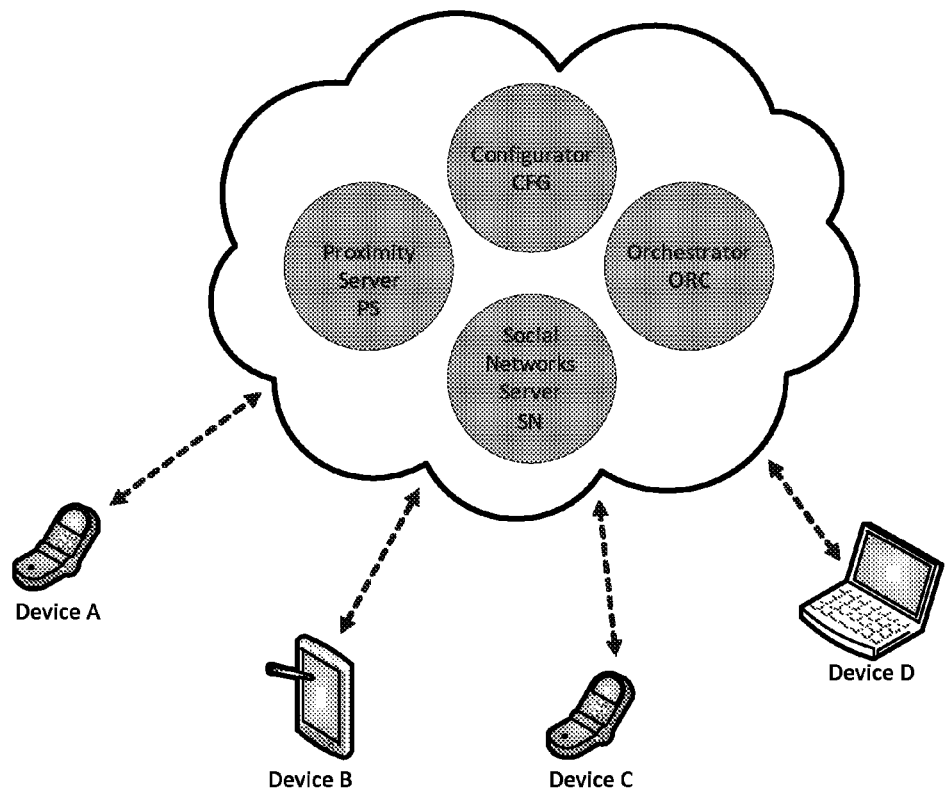
FIGS. 3a and 3b show example systems for proximity-based services.
Figure 3B:
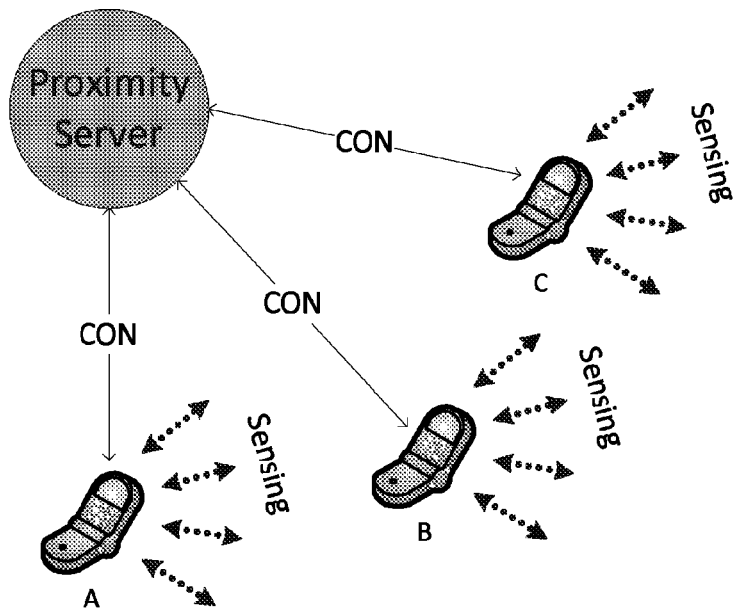

FIGS. 3a and 3b show example systems for proximity-based services.

One system for proximity-based services is presented in FIG. 3a. Proximity Server PS may orchestrate proximity sensing and maintain a proximity graph of devices as explained later in this description. The joint actions/collaborative applications, in which the devices participate, may have a precondition requiring that devices are, e.g. 1) in the proximity of each other (PS), 2) "friends", or more accurately they belong to the same social group or their social distance is smaller than a given threshold, e.g. the human owners are friends/in the same group, they are friends of a friend etc., and/or 3) capable to perform their part or role in the joint action/collaborative application, e.g. in an interaction dialog devices need to be able to communicate with each other.

A social network server SN may provide social network information. A configurator CFG may take the information from SN and PS, and the configurator CFG itself may have information about each device's capabilities. Combining this information with the precondition of each action, the configurator CFG may produce a list of possible actions fulfilling the preconditions. An action is picked from the list of possible actions based on e.g. some ranking algorithm. The orchestrator ORC may be responsible for executing the action by sending a control signal to participating devices to execute a role as specified in the action description, e.g. Device A has a storage containing a JPEG image (a photo source), Device B is a public display (sink for JPEG images).

FIG. 3b presents one system configuration. A proximity Server PS may store the discovery data sensed by the Device A, B and C. There may be a two-way connection "CON" between each device and the Proximity Server, or transport of information may be arranged in another manner, e.g. using a packet network. Devices may be using various, heterogeneous techniques to discover the proximity of other devices, e.g. Bluetooth discovery, WLAN access point information, cellular base station information, GPS and other satellite-based location information, various indoor positioning techniques (based on e.g. WLAN, BT) and/or light or sound beacons (beacons fixed in the space or one mobile device acting as a beacon). The proximity server PS may post-process the discovery data.

When a device joins the system, the proximity server may create a representation of the device—e.g. a node in a graph. In the simplest form, the server may control each device by sending a discovery control signal to the device instructing when (or how often) the device should sense its surroundings to perform a discovery, and which technology to use, e.g. with an instruction containing the information "Perform a Bluetooth scan periodically every 120 seconds with power level 3".

Figure 4A:
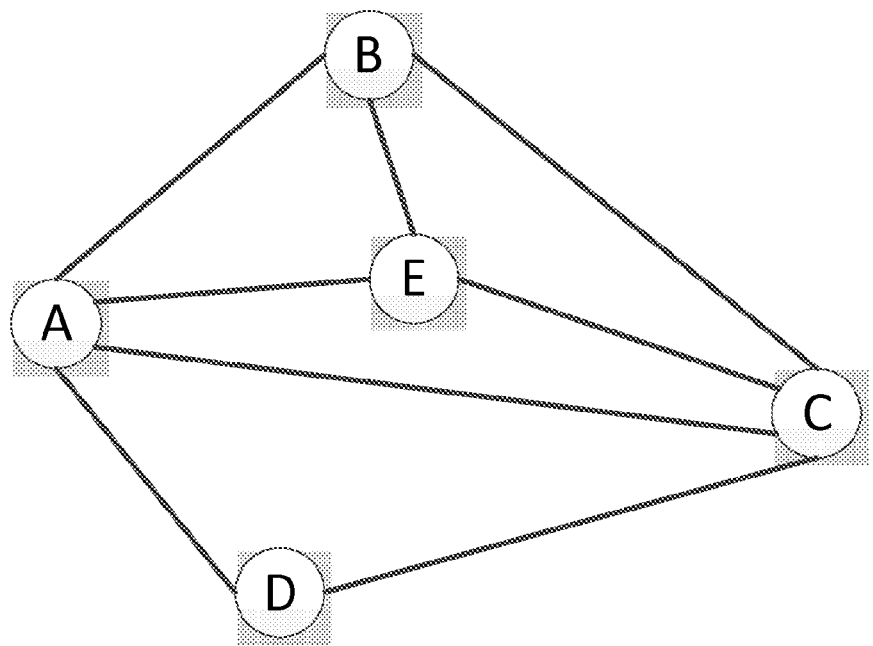
FIGS. 4a and 4b show proximity graphs according to example embodiments.
Figure 4B:
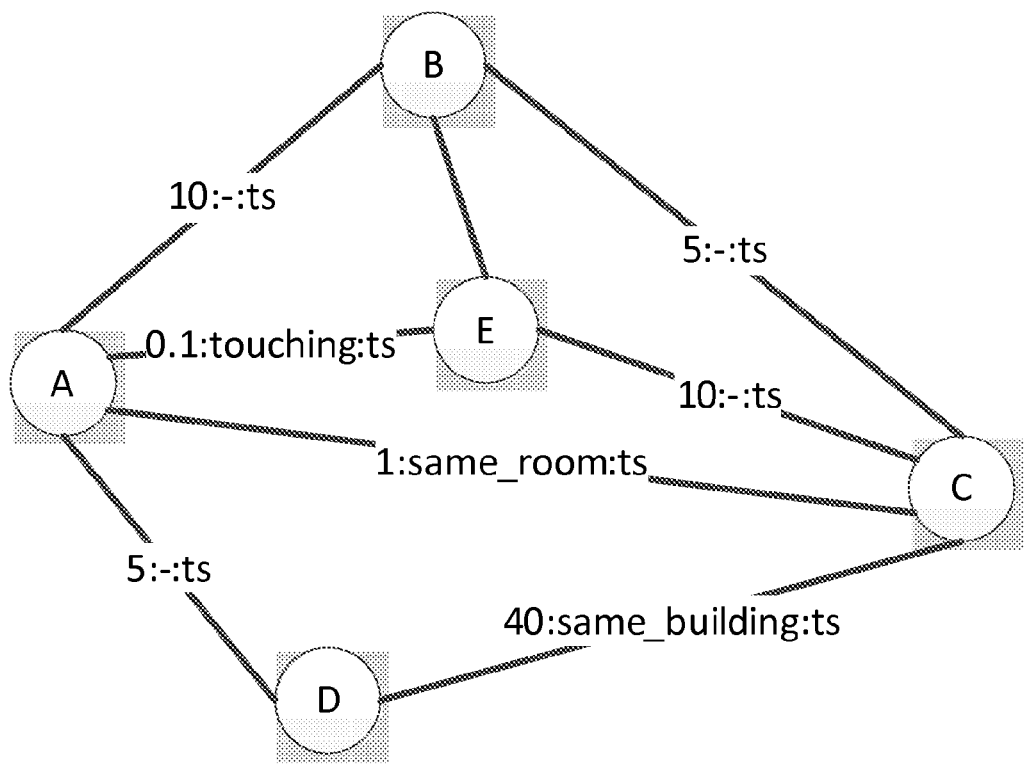

FIGS. 4a and 4b show proximity graphs according to example embodiments.

In FIG. 4a, the various devices are represented by nodes A, B, C, D and E. Device A is in the proximity of all other devices B, C, D and E. Device B is in the proximity of device A (reciprocally) and with devices C and E. Device C is proximal to all other devices, and device D is proximal to devices A and C. Device E is proximal to devices A, B and C. It needs to be noted that the proximity of two devices with each other may be discovered by one device, e.g. device A may discover device D, and it may be deduced that device A is also proximal to device D without device D doing any discovery. That is, proximity may be interpreted to be reciprocal.

In an embodiment, the proximity server PS may orchestrate the devices based on the current and past proximity graph information. The proximity information may thus be stored as a graph as depicted in FIG. 4a. The graph edges may have e.g. the following information: 1) a distance between devices, estimated from the discovery and expressed e.g. in meters, 2) time stamp indicating the time when the discovery of the proximity data corresponding to the edge was carried out and 3) additional proximity data, e.g. indicating whether the devices are touching (detected e.g. with NFC), in the same_room, or in the same_building.

In FIG. 4b, the same proximity graph as in FIG. 4a shows properties of the proximity connections (the edges of the graph). For example, the proximity between devices A and E has the properties of a distance of 0.1 meters, the information that the devices are touching (e.g. through NFC), and a time stamp when the proximity was discovered.

The proximity server PS may also keep track of what capabilities each device has for proximity discovery and the status of each technique. This is illustrated in the below table.

| Device: Device A | | |
|---|---|---|
| Sensing technique | Status | Data |
| Bluetooth | Active | Device B, Device C |
| GPS | Inactive | — |
| Cell ID | Connected | LAC: 18994 |
| | | Cell ID: 40992 |
| | | MCC: 310 |
| | | MNC: 1040 |
| ... | ... | ... |

In the table, each device (shown here for device A only) may have a list of sensing (discovery) techniques for discovering proximal devices. Such techniques, or discovery channels, may be, as shown, e.g. Bluetooth, GPS, cellular network Cell ID and others. Each discovery channel may have an associated status information such as active, inactive and connected. For each discovery channel, there may be additional proximity information such as discovered proximal device identifiers (shown for Bluetooth), or cell identification information. It needs to be noted that it may be relevant information for the system that no proximal devices have been discovered (found), that is, it can be expected that there are no devices to communicate with. This information can also be stored in the system.

FIGS. 5a, 5b, 5c and 5d illustrate proximity detection arrangements and operation according to example embodiments in various situations. for example, depending on the application, proximity sensing may have to be performed quite frequently by the devices. This results in power consumption on the battery-operated mobile devices.

Server orchestration (control) of discovery is used to control the devices' proximity sensing in order to reduce the power consumption on battery powered devices and/or to improve the perceived user experience by controlling the proximity sensing based on current device status. In the described system the devices sensing the proximity of other devices communicate this information to server which maintains the proximity information in a graph. Besides, the proximity information the devices may communicate various kinds of status information (like battery charging level, is the device connected to a charger and various sensor data) to the server.

Discovery control may be carried out, for example, in the following situations:
  Bluetooth optimization by orchestrating the discovery process
  Minimizing proximity sensing on battery-powered devices
  Reducing proximity sensing on devices with low battery
  Reducing proximity sensing in dense device sets
  Using hierarchical proximity information to limit devices from carrying out intensive proximity sensing
  Performing server-side optimizations to reduce the complexity of graph traversal based on hierarchical proximity data
  Minimizing proximity sensing for stationary devices As an example of orchestrating the measurements of the devices, a Proximity Server PS may instruct device A to start Bluetooth discovery (inquiry) and at the same time, in a synchronized manner, PS is telling device C to start continuous inquiry scanning. In this example devices may be carrying out the discovery for approximately 25 ms for A to get a response, while without synchronization the discovery may take approximately 5-10 s. This advantage may be achieved through time synchronization of devices by the proximity server. Without the proximity server, this synchronization information is not known and a device has to perform long inquiry and the other device has to perform periodic scanning. In addition, Bluetooth discovery may take a lot of time and it may in practice block WLAN operation during discovery. Limiting Bluetooth discovery operation to a shorter period leaves more time to WLAN operation and hence limits the blackouts to WLAN traffic.

Figure 5A:
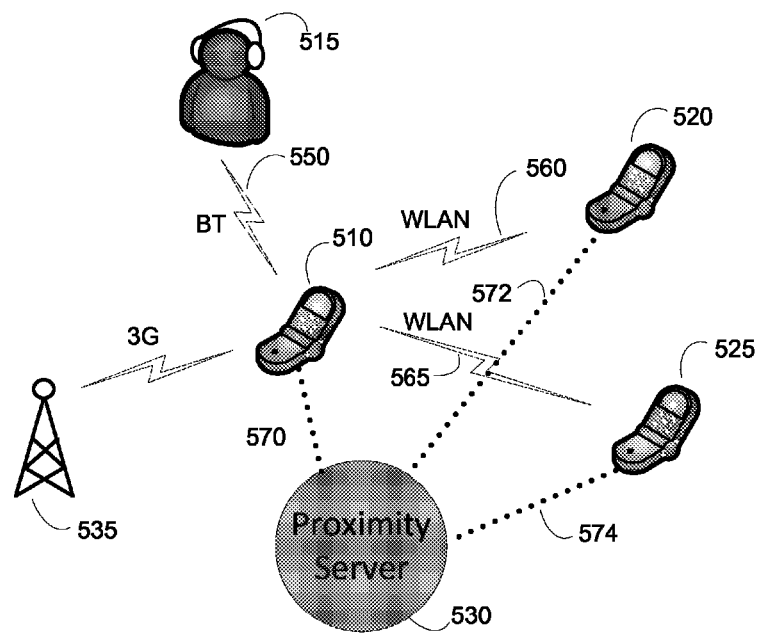
FIGS. 5a, 5b, 5c and 5d illustrate proximity detection arrangements and operation according to example embodiments.

FIG. 5a depicts an embodiment for optimization of discovery in an environment with multiple simultaneously available radio channels, such as Bluetooth 550 and WLAN 560, 565. In such an environment, proximity detection and distance estimation may be chosen to be performed with the most appropriate technology available. For example, if there is limitation to use Bluetooth 550, e.g. BT headset 515 is used over the Bluetooth connection 550 in a phone call of a device 510, the Proximity Server 530 may order a device (520, 525) to perform measurements with WLAN. PS 530 may order one device 520 to perform probe functionality in certain channel and another device to perform scanning on that same channel. The scanning device may be activated first and then the other device 510 using the BT headset may perform a short probe functionality controlled by the PS 530; in this way the Bluetooth link is not disturbed. The controlling of the devices may happen via various signals 570, 572, 574, for example control messages as shown in FIG. 5b.

Figure 5B:
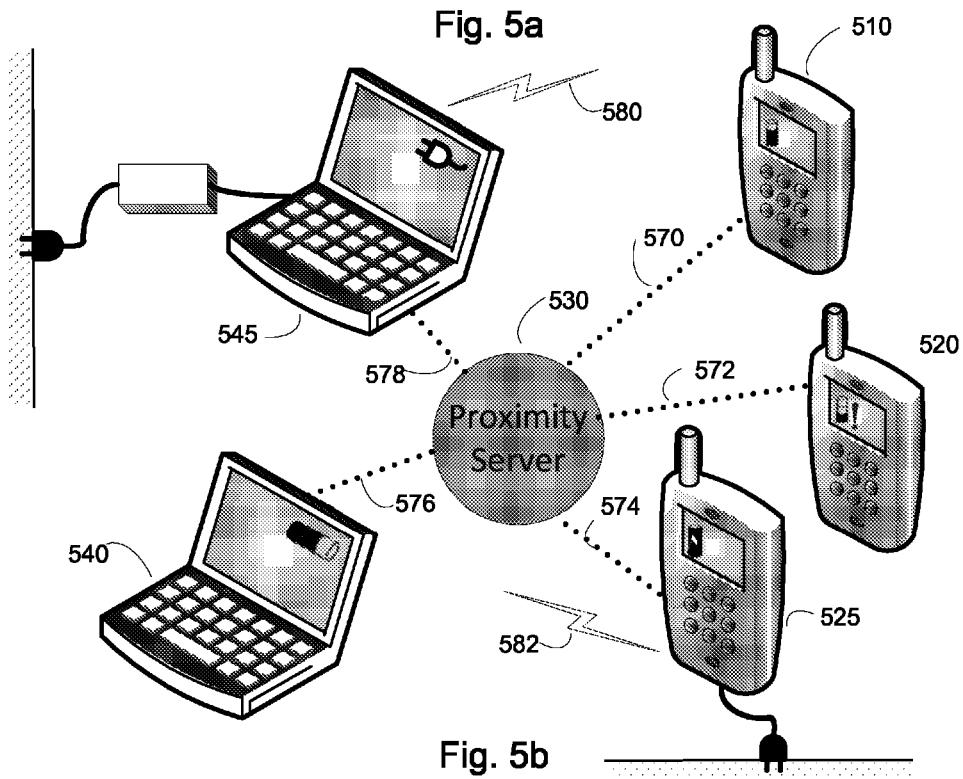

FIG. 5b depicts an embodiment where proximity sensing on battery-powered devices and/or devices with low batter is reduced or avoided. In environments where some devices 520, 510, 540 are battery operated and some devices 525, 545 are mains-powered, or they are connected to a charger, the proximity server orchestrates mains-powered devices to perform proximity scanning more frequently than battery operated ones. Devices communicate the charger connection status or mains powered device type to the proximity server. This information is used to control the proximity sensing schemes of devices, for example by setting the proximity sensing frequency or selecting the device to carry out the most power-consuming role 580, 582 (e.g. requiring most radio transmissions) in proximity discovery.

Devices with low battery may perform less frequent sensing than other devices having more battery capacity left. This may be implemented so that devices communicate the charge level of their batteries to the server, which then computes globally optimized parameters for carrying out proximity discovery for devices in each other's proximity, and sends them to the devices. In a simpler example, the device itself may decide on the proximity sensing: the sensing frequency may be a function mapping the charging state to the sensing frequency. These two approaches may also be combined so that the device receives a discovery control signal 570, 572, 574, 576, 578 from the proximity server 530 and carries out proximity sensing based on the control signal and adjusting according to the power level. This adjustment according to power level may be communicated to the proximity server.

Moreover, proportional power consumption of the proximity sensing may vary with device type: proximity sensing may not noticeably reduce operating time of a battery-powered laptop compared to a mobile phone, since proximity sensing is proportionally lighter task on a laptop even though the absolute power consumption may be bigger. This information of the relative power required for proximity discovery may also be used in global optimization.

Figure 5C:
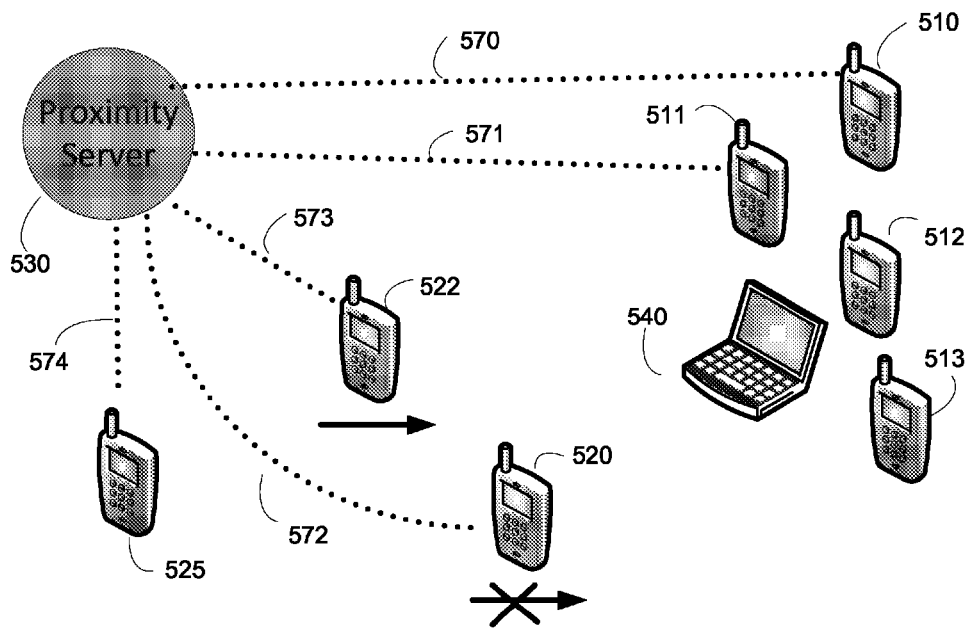

FIG. 5c depicts an embodiment where a proximity sensing is reduced in dense device sets. When many devices are in each other's proximity, continuous sensing produces redundant information (especially in the middle of a proximity group same devices keep on sensing each other), since the devices continuously sense the same devices. Reducing sensing in this kind of setting prevents the server from experiencing flood of redundant proximity information and significantly reduces the power consumption on the devices. Devices 510, 511, 512, 513 and 540 are physically close to each other and thus form a dense device set. This is determined by the proximity server 530 e.g. from earlier proximity sensing information and/or from coarse proximity information (see below). The proximity server may send a discovery control signal 570, 571 instructing to reduce proximity sensing.

Devices 520 not moving may also be instructed to sense the changes less frequently than devices 522 that are moving. Various sensors (e.g. accelerometer in the device, camera in the environment) may be used to detect if a device moves. If all devices in a given space are stationary, there are no changes in the proximity graphs after initial proximity sensing has been done. Proximity server 530 can receive this information as device status information ("stationary device") and minimize or completely stop the proximity sensing on this device. If a new device arrives, this new moving device causes changes to the proximity graph. Based on the new edge in the proximity graph, also the neighboring stationary devices may temporarily perform proximity sensing more frequently until all the graph edges in the proximity graph have likely been created.

Figure 5D:
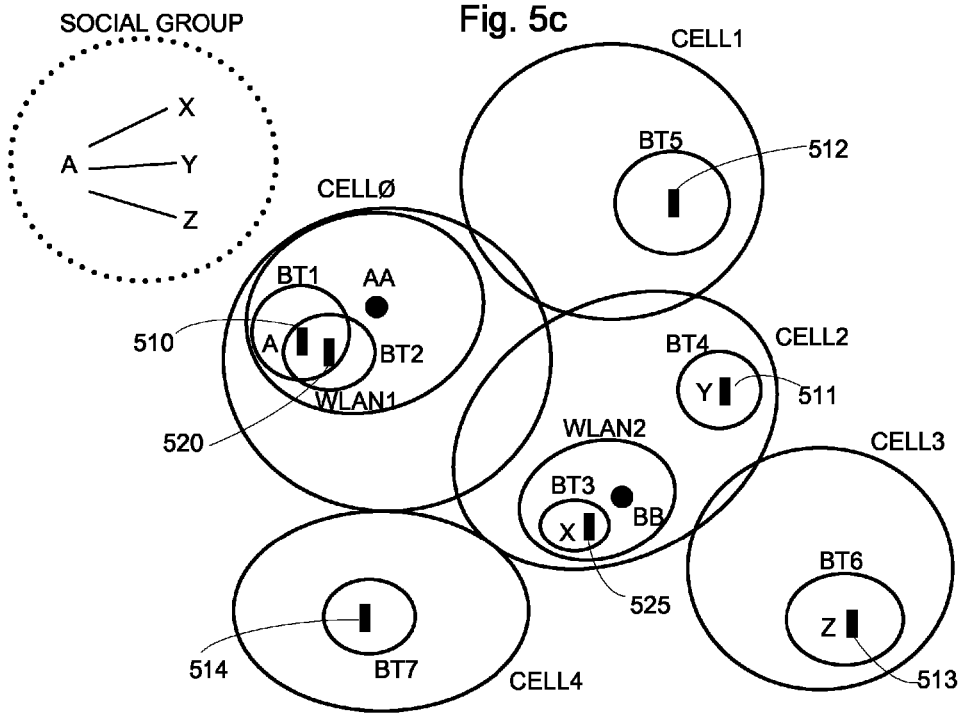

In FIG. 5d, an embodiment utilizing hierarchical proximity information and/or coarse proximity information is depicted. In a setting of hierarchical proximity, proximity information is available at different resolutions. This may be implemented e.g. with different radio technologies used in proximity sensing. Cell ID of a GSM/3G radio provides an example of a coarse proximity information, followed by WLAN access point ID, Bluetooth discovery and finally NFC touch being the most detailed (short-range) proximity sensing channel. Other radio-based sensing and positioning techniques (various short range radios, GPS) and non-radio based sensing may be used as well (e.g. audio or light beacon+sensing). Coarse proximity information may be used to exclude devices from more detailed proximity sensing. In the following, optimizations based on hierarchical proximity information are described.

Devices hearing the same Wi-Fi access point are likely to be relatively near to each other. This is indicated in FIG. 5d for devices 510 and 520 both hearing the Wi-Fi access point AA of the WLAN cell WLAN1. Both devices have their own respective Bluetooth ranges BT1 and BT2. In this case, the devices 510 and 520 are close enough to each other so that their Bluetooth receivers can hear each other's Bluetooth transmitter. The "same cell" information may be utilized so that if all possible or a sufficient number of edges have been found in a local area (the same Wi-Fi), the proximity server 530 (not shown in FIG. 5d) may deduce that the proximity graph is complete and the sensing interval can be lengthened or suspended altogether for some devices, in this case 510 and 520. For devices who are "alone" in a cell, like 511, 512, 513, 514 and 525, the proximity sensing may be carried out with a regular interval. Instead or in addition to the WLAN network, e.g. GSM/3G cells CELL0, CELL1 etc. can be used to determine whether two devices are close to each other. This determination may happen so that the devices send status information to the proximity server 530 on the WLAN and GSM/3G cells they hear, and the proximity server then deduces which devices may be close to each other.

Devices of interest may be limited to a subset of devices, e.g. to devices that are "friends" via their owners' social network in a social media service or in the phone books of the devices. As an example, device A 510 may be looking for friend devices X 525, Y 511 and Z 513 in the proximity. The users of the devices A, X, Y and Z belong to the same social group. The social information may be delivered to the proximity server from one or more of the devices, or it may be obtained from a social network service or from another information storage. Also, devices having a specific capability e.g. "public display" may be determined to be a group of interest and the proximity search may be limited accordingly. In the case of FIG. 5d and the social group embodiment, all devices belonging to this group of interest are known to be distant by cell ID from device A, and therefore more accurate sensing by device A is not needed. On the other hand, the proximity server 530 may instruct devices X 525 and Y 511 to try and discover each other, for example in a synchronized manner as described above.

A concept of a coarse proximity group may also be used to carry out discovery in an efficient manner. For example, if it is known from the status information to the proximity server that there are no other devices within the coarse proximity group, discovery may be omitted or made less frequent. As an example, a user of a mobile device 513 may be alone on an island on a summer cottage, and it is clear that no other devices will be in the vicinity, this information may be deduced from the status information of which cells are heard by the device. Devices 510, 520 being in the same cell (CELL0) have a mutual distance which is in the range [0, diameter(CELL0)]. This holds, because the devices can be touching each other or—in other extreme—they can be located in the opposite sides of the cell, or they are somewhere in-between. Similarly, devices 511, 512 being in the adjacent cells (CELL1 and CELL2) have a mutual distance in the range [0, diameter(CELL1)+diameter(CELL2)]. And finally, for devices 513 and 514 being in different non-adjacent cells (CELL3 and CELL4), the mutual distance is [distance(CELL3,CELL4), distance(CELL3,CELL4)+diameter(CELL3)+diameter(CELL4)], where distance (CELL3,CELL4) is the shortest path from the border of CELL3 to CELL4. In some applications, this kind of coarse proximity may be sufficient in resolution, and the server may avoid actual graph traversal for computing the proximity of each device from each other, thus saving resources (energy and computation time).

Detecting groups of interconnected devices (that may have close proximity) may be used for server side optimization of proximity graph traversal. Detecting local interconnected groups can be deduced from the Proximity graph. However, this may require many graph traversal operations in practice. The aforementioned radio technology hierarchy can be used here as well. The whole Proximity graph may be hierarchically partitioned to subgraphs, e.g., in the layers of "same cellular base station"—"same Wi-Fi"—Bluetooth. The graph traversal can then be limited to the appropriate partition.

In the various embodiments of FIGS. 5a, 5b, 5c and 5d, the orchestrated proximity sensing based on device status information may improve energy efficiency for the whole network of devices in carrying out proximity discovery. In addition, manipulating (traversing) the proximity graph on the server side is improved, resulting in eased capacity requirements and/or better performance for the users.

Figure 6:
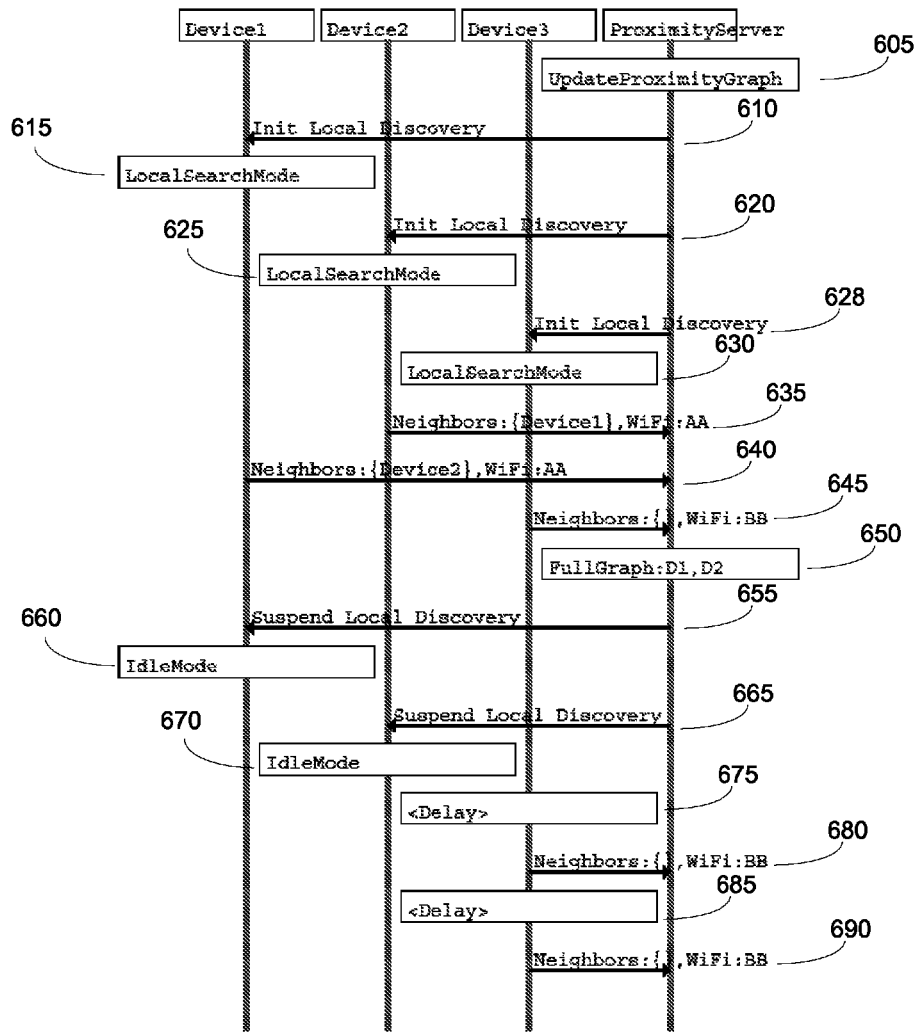
FIG. 6 shows a signaling diagram for controlling proximity detection according to an example embodiment.

FIG. 6 shows a signaling diagram for controlling proximity detection according to an example embodiment.

Optimizing the sensing interval may be based on Proximity Graph connectivity information, as depicted in FIG. 6. First, after starting the graph update in 605, the Proximity Server initializes the periodic Local Search process in all three devices by sending messages 610, 620, 628. After carrying out local searches 615, 625, 628, devices 1 and 2 report back that they have found each other as (Bluetooth) neighbors and they both hear the same Wi-Fi access point AA by sending messages 635, 640. Device 3 reports no (BT) neighbors and that it hears Wi-Fi AP BB by sending a message 645. Based on this status information, the proximity server PS deducts in 650 that the connectivity is complete for Devices 1 and 2 and, thus, their Local Search processes can be suspended for the time being. Consequently, the proximity server sends device 1 and device 2 a discovery control signal 655 and 665, whereby the devices enter idle mode 660, 670. This saves energy for both devices. Device 3 keeps repeating the Local Search periodically, that is, after delays 675, 685 device 3 carries out proximity detection and sends status information 680, 690 to the proximity server.

Figure 7A:
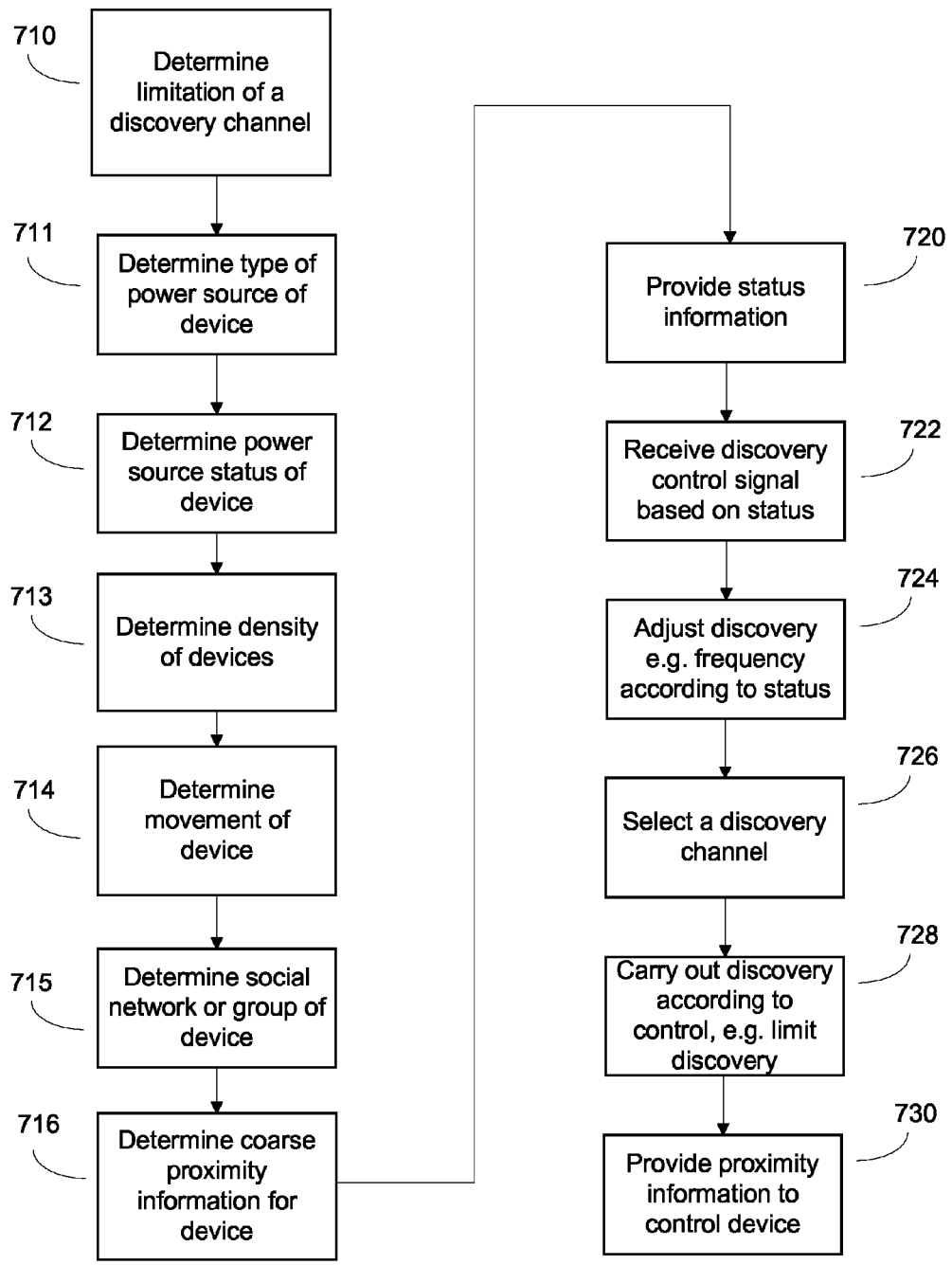
FIGS. 7a and 7b show flow charts for discovery of proximal devices according to example embodiments.

FIG. 7a shows a flow chart for discovery of proximal devices according to example embodiments. In a device, in phases 710, 711, 712, 713, 714, 715 and 716, various kinds of status information may be determined. This determining may happen in any order, and some or most of the shown status information may be omitted. In phase 710, a limitation to use a discovery channel, such as in FIG. 5a, is determined. In phase 711, a power source type may be determined, and in phase 712, a status of the power source may be determined, as in FIG. 5b. In phase 713, a density of devices may be determined, and in phase 714, a movement of one or more devices may be determined, as in FIG. 5c. In phase 715, a social group related to a device may be determined, and in phase 716, coarse proximity information may be determined, as in FIG. 5d.

In phase 720, the device may send a signal or a message, or otherwise provide some or all of the collected status information to be accessible to a proximity server. In phase 722, the device may receive a discovery control signal from the proximity server. In phase 724, the device may use this discovery control signal to adjust the parameters of carrying out discovery, e.g. adjust the frequency with which it carries out discovery. In phase 726, the device may select a discovery channel based on the discovery control signal. In phase 728, the device may carry out discovery or omit or limit carrying out discovery based on the discovery control message, and possibly other inputs like power status. In phase 730, the device may provide the obtained proximity information to the control device (proximity server).

The proximity information may comprise information indicative of distance between devices, and an identification of a discovery channel used for discovery. The discovery control signal may comprise timing information e.g. on timing of the discovery of proximal devices to be done, such as a time instance or a frequency of discovery. Timing information may comprise e.g. the next time instance for performing discovery, a series of time instances for performing discovery, a frequency of discovery attempts to be performed, or other time-related information e.g. for delaying discovery by a certain time if another device is detected to be performing discovery or communication at the same time (for collision avoidance). The device may also e.g. randomly modify the received timing. The control signal may comprise information on how the discovery is to be carried out (which channel to use, e.g. Bluetooth or WLAN).

Figure 7B:
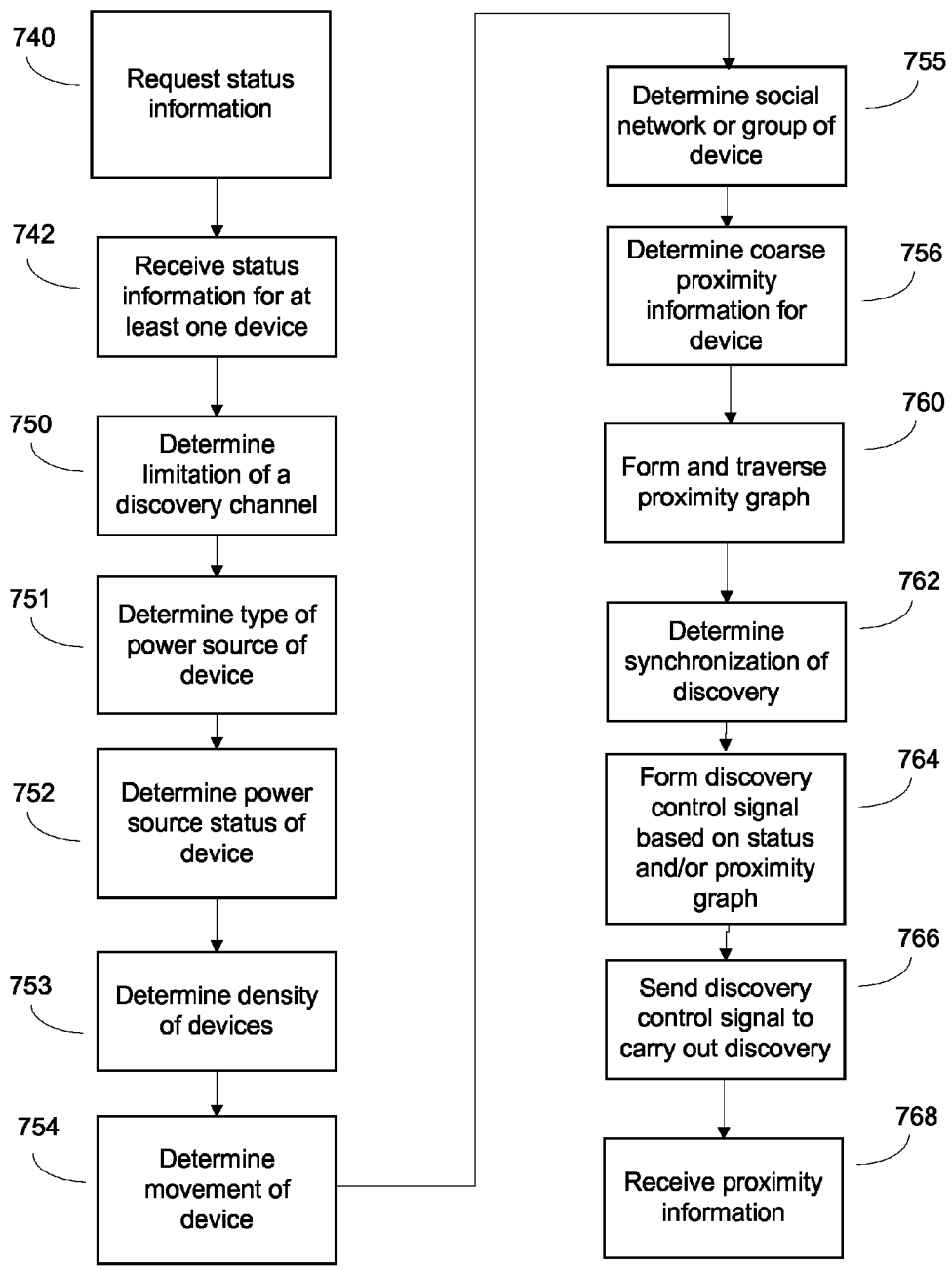

FIG. 7b show a flow chart for discovery of proximal devices according to example embodiments. In a proximity server, the status information of one or more devices may be requested in phase 740. In phase 742, status information may be received from or for a number of devices. From the status information, various statuses may be determined in phases 750, 751, 752, 753, 754, 755 and 756. In phase 750, a limitation to use a discovery channel may be determined. In phase 751, a type of power source used by a device may be determined. In phase 752, a status of a power source of a device may be determined. In phase 753, a density of devices may be determined. In phase 754, a movement of one or more devices may be determined, in phase 755, a social group of devices may be determined. In phase 756, coarse proximity information or hierarchical proximity information may be determined.

In phase 760, based on having received status information from one or more devices, the proximity server may build and/or traverse the proximity graph as described earlier. Based on the proximity information and the status information, the proximity server may determine a synchronization of proximity detection for two or more devices in phase 762. In phase 764, the proximity server may form a discovery control signal at least partially based on the status information, wherein the control signal comprises information on which device, in which role and when will carry out the discovery. In phase 766, this discovery control signal, message or information may be delivered by transmitting, sending or otherwise providing accessible to a device. In response to the discovery control signal, devices may carry out discovery and respond by sending proximity information to the proximity server. This proximity information may be received in phase 768.

Figure 7C:
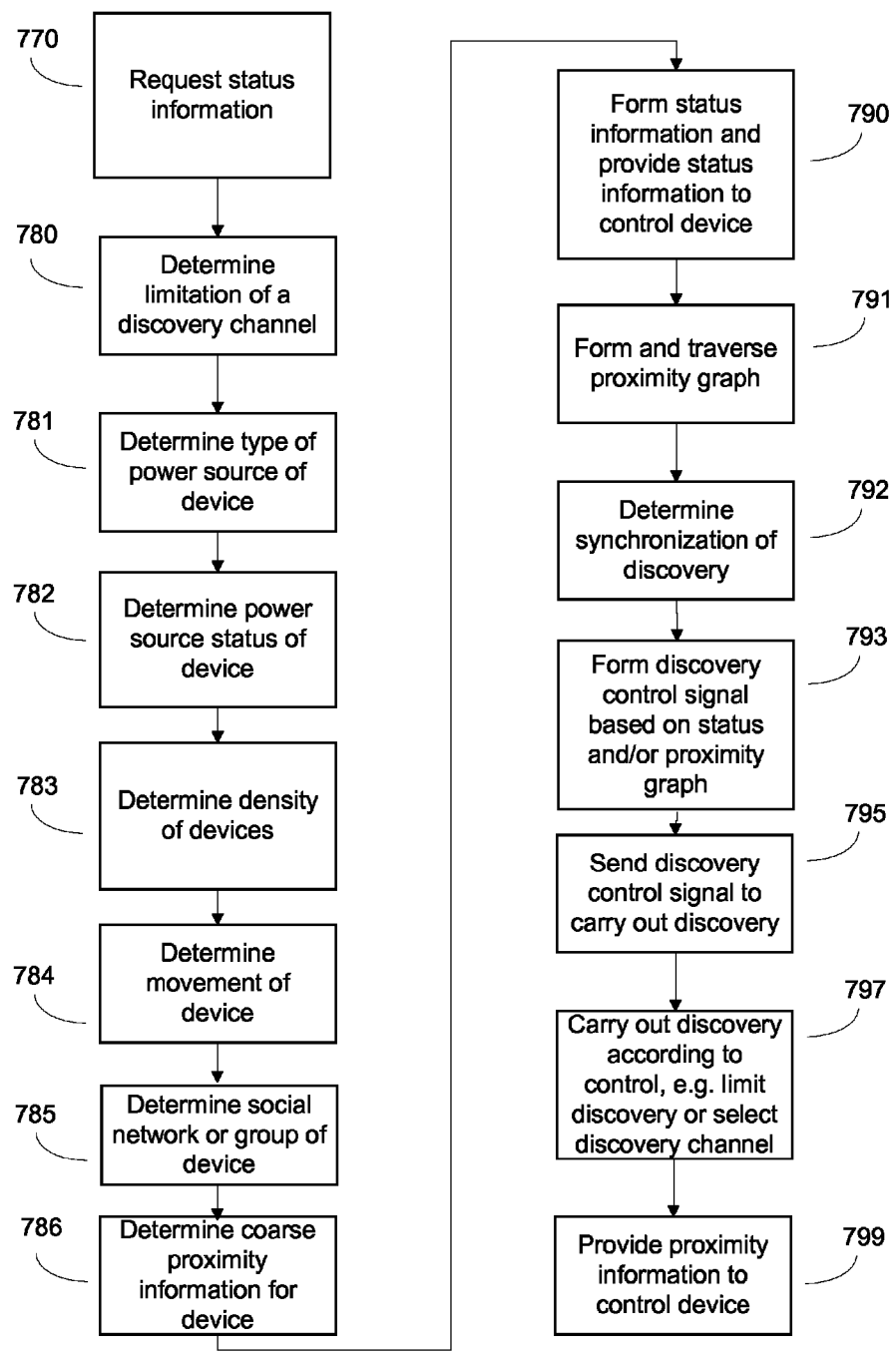
FIG. 7c shows a flow chart for a system where discovery of proximal devices is facilitated according to an example embodiment.

FIG. 7c shows a flow chart for a system where discovery of proximal devices is facilitated according to an example embodiment. In a proximity server, the status information of one or more devices may be requested in phase 770. In a device, status information may be determined in phases 780, 781, 782, 783, 784, 785 and 786 as described for FIG. 7a. Correspondingly, this status information may be determined at the proximity server when the device has delivered the status information to the server in phase 790.

In phase 791, based on having received status information from one or more devices, the proximity server may build and/or traverse the proximity graph as described earlier. Based on the proximity information and the status information, the proximity server may determine a synchronization of proximity detection for two or more devices in phase 792. In phase 793, the proximity server may form a discovery control signal at least partially based on the status information, wherein the control signal comprises information on which device, in which role and when will carry out the discovery. In phase 795, this discovery control signal, message or information may be delivered by transmitting, sending or otherwise providing accessible to a device. In response to the discovery control signal, devices may carry out discovery in phase 797 and respond by sending proximity information to the proximity server in phase 799. This proximity information may be received by the proximity server.

A proximity graph may be formed using the proximity information. For example, the proximity graph may be updated with new information and previous proximity graph information may be stored as history data. A new proximity graph may be formed if a previous proximity graph does not exist. The forming and updating of the proximity graph may employ techniques for spanning a network, e.g. so that the graph is traversed starting from one node using e.g. depth-first or breadth-first traversing.

In one example, the server may obtain proximity information from a first device, e.g. comprising information that a second device is nearby and has been discovered at a certain time. The server may then control the future discovery actions of the first device, and the server may also control the discovery actions of the second device even though the second device has not sent proximity information to the server. In other words, the proximity information, wherever it has been obtained from, may be used to control the discovery of nearby devices by any device regardless of whether or not that device has sent proximity information to the server.

The proximity server PS may control which devices perform the discovery and by which technique, and at which time. The proximity server PS may control each discovery action separately or command a periodic discovery. The device may report the status of its sensing techniques to the server. For example, if GPS positioning is used for some other application and therefore its status is "active" even if the proximity server PS has not instructed to activate the GPS, the proximity server PS can then instruct the device to send GPS location periodically because the GPS is already on.

Each edge in the proximity graph representing proximity between two devices may have a time stamp value indicating when the proximity sensing was carried out. When new sensing information becomes available, the time stamp may be updated. The proximity may be sensed with various techniques, e.g. initial edge in the graph may be created based on NFC (near-field communication) touch gesture and the edge time stamp may be updated based on Bluetooth discovery. In this case also the proximity Distance and Additional proximity data may be updated. Alternatively or in addition, the time stamp may be specific to a discovery channel, i.e. not just to the edge.

The various embodiments may improve the efficiency of proximity detection through the use of proximity information and/or device status information to control the proximal discovery, e.g. by exploiting the characteristics of different radio technologies. For example, it is relatively safe to let two devices that hear different cellular base stations to discover their environment with Bluetooth simultaneously—due to the shorter range of Bluetooth, the discovery signals would not disturb each other (no collision would be caused). Correspondingly, devices hearing the same Wi-Fi (WLAN) access point are likely to be relatively near to each other.

If devices A, B and C are in the proximity of each other, the proximity server PS may instruct the devices to perform the discovery so that their individual sensing periods do not overlap and hence block/disturb the sensing. This may provide the advantage that discovery is more successful than without this orchestrating.

The proximity server PS may command device A to function as a beacon (e.g. by transmitting audio or infrared light) and command devices B and C to listen to that beacon. The proximity server PS may choose any devices that should participate to this, especially to test if devices that are known to be in the proximity (based on some other sensing technique, e.g. Bluetooth) are actually e.g. in the same room. Bluetooth may indicate that the devices are near each other, but if they are not able to observe the beacon, it may be determined that they are not in the same room.

The various embodiments may provide advantages. Orchestrating the discovery based on status information may reduce unnecessary or failed proximity sensing e.g. in the situation of concurrent overlapping radio networks of FIGS. 5a and 5d. The discovery control may also make it possible to utilize device resources effectively, for example to save battery, as in FIG. 5b. Controlling the use of various discovery techniques (for example, the use of several different techniques for discovery), the embodiments may use additional information (e.g. which devices are in the same room or otherwise densely arranged) in controlling discovery. Relevance of discovery may also be improved e.g. by utilizing social network information in controlling discovery.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the terminal device to carry out the features of an embodiment. Yet further, a network device may comprise circuitry and electronics for handling, receiving and transmitting data, computer program code in a memory, and a processor that, when running the computer program code, causes the network device to carry out the features of an embodiment.

It is obvious that the present invention is not limited solely to the above-presented embodiments, but it can be modified within the scope of the appended claims.

The invention claimed is:

1. A method, comprising:
forming status information comprising information on a power source state of a device including remaining battery energy,
sending status information to a control device,
receiving a discovery control signal from the control device, said discovery control signal having been formed at least partially based on said status information, and
carrying out discovery of proximal devices based on said discovery control signal and said power source state, wherein carrying out discovery of proximal devices comprises performing a graph traversal based on the discovery control signal and hierarchical proximity information, and wherein carrying out said discovery comprises determining discovery frequency at least partially based on remaining battery energy.

2. The method according to claim 1, comprising:
determining a density measure indicative of proximal devices, for example using a number of detected devices or detected networks, and
forming said status information to comprise information on said density measure.

3. The method according to claim 1, comprising:
forming said status information to comprise information on physical movement of a device, for example by using an accelerometer.

4. The method according to claim 1, comprising:
determining a coarse proximity information related to at least one radio channel, said coarse proximity information comprising information on availability of said radio channel at a device, and forming said status information to comprise information on said coarse proximity information.

5. The method according to claim 1, comprising:
sending proximity information of discovered proximal devices to said control device for creation of said discovery control signal based on said proximity information.

6. A method, comprising:
receiving status information from at least one device comprising information on a power source state of the at least one device including remaining battery energy,
forming a discovery control signal based at least partially on said received status information, and
sending said discovery control signal to a first device for controlling discovery of proximal devices based on said power source state and in accordance with a proximity graph based on the discovery control signal and hierarchical proximity information and also in accordance with a discovery frequency at least partially based on remaining battery energy.

7. The method according to claim 6, comprising:
determining a density measure for location of devices; for example using a number of detected devices or detected networks, or from said status information; and
forming said discovery control signal based on said density measure.

8. The method according to claim 6, comprising:
forming said discovery control signal based on physical movement of a device, for example by using information from an accelerometer or positioning unit.

9. The method according to claim 6, comprising:
determining a coarse proximity information related to at least one radio channel, said coarse proximity information comprising information on availability of said radio channel at a device, and
forming said discovery control signal based on said coarse proximity information.

10. An apparatus comprising at least one processor, and memory including computer program code, the memory and the computer program code configured to, with the at least one processor, cause the apparatus to perform at least the following:
form status information comprising information on a power source state of a device including remaining battery energy,
send status information to a control device,
receive a discovery control signal from the control device, said discovery control signal having been formed at least partially based on said status information, and
carry out discovery of proximal devices based on said discovery control signal and said power source state, wherein carrying out discovery of proximal devices comprises performing a graph traversal based on the discovery control signal and hierarchical proximity information, and wherein carrying out said discovery comprises determining discovery frequency at least partially based on remaining battery energy.

11. The apparatus according to claim 10, further comprising computer program code configured to, with the at least one processor, cause the apparatus to perform at least the following:
determine a density measure indicative of proximal devices, for example using a number of detected devices or detected networks, and
form said status information to comprise information on said density measure.

12. The apparatus according to claim 10, further comprising computer program code configured to, with the at least one processor, cause the apparatus to perform at least the following:
form said status information to comprise information on physical movement of a device, for example by using an accelerometer.

13. The apparatus according to claim 10, further comprising computer program code configured to, with the at least one processor, cause the apparatus to perform at least the following:
determine a coarse proximity information related to at least one radio channel, said coarse proximity information comprising information on availability of said radio channel at a device, and
form said status information to comprise information on said coarse proximity information.

14. An apparatus comprising at least one processor, and memory including computer program code, the memory and the computer program code configured to, with the at least one processor, cause the apparatus to perform at least the following:
receive status information from at least one device comprising information on a power source state of the at least one device including remaining battery energy,
form a discovery control signal based at least partially on said received status information, and
send said discovery control signal to a first device for controlling discovery of proximal devices based on said power source state and in accordance with a proximity graph based on the discovery control signal and hierarchical proximity information and also in accordance with a discovery frequency at least partially based on remaining battery energy.

15. The apparatus according to claim 14, further comprising computer program code configured to, with the at least one processor, cause the apparatus to perform at least the following:
determine a density measure for location of devices; for example using a number of detected devices or detected networks, and/or from said status information; and
form said discovery control signal based on said density measure.

16. The apparatus according to claim 14, further comprising computer program code configured to, with the at least one processor, cause the apparatus to perform at least the following:
form said discovery control signal based on physical movement of a device, for example by using information from an accelerometer or positioning unit.

17. The apparatus according to claim 14, further comprising computer program code configured to, with the at least one processor, cause the apparatus to perform at least the following:
determine a coarse proximity information related to at least one radio channel, said coarse proximity information comprising information on availability of said radio channel at a device, and
form said discovery control signal based on said coarse proximity information.

18. A computer program product embodied on a non-transitory computer readable medium, comprising computer program code configured to, when executed on at least one processor, cause an apparatus or a system to:
form status information comprising information on a power source state of a device including remaining battery energy, send status information to a control device,
receive a discovery control signal from the control device, said discovery control signal having been formed at least partially based on said status information, and
carry out discovery of proximal devices based on said discovery control signal and said power source state, wherein carrying out discovery of proximal devices comprises performing a graph traversal based on the discovery control signal and hierarchical proximity information, and wherein carrying out said discovery comprises determining discovery frequency at least partially based on remaining battery energy.

* * * * *